United States Patent
Kohli

(10) Patent No.: US 11,868,981 B2
(45) Date of Patent: Jan. 9, 2024

(54) SYSTEM AND METHOD TO SUPPORT PAYMENT ACCEPTANCE CAPABILITY FOR MERCHANTS

(71) Applicant: Mastercard International Incorporated, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 411 days.

(21) Appl. No.: 16/944,726

(22) Filed: Jul. 31, 2020

(65) Prior Publication Data
US 2021/0035083 A1 Feb. 4, 2021

Related U.S. Application Data
(60) Provisional application No. 62/882,331, filed on Aug. 2, 2019.

(51) Int. Cl.
*G06Q 20/20* (2012.01)

(52) U.S. Cl.
CPC ....... *G06Q 20/206* (2013.01); *G06Q 2220/00* (2013.01)

(58) Field of Classification Search
None
See application file for complete search history.

(56) References Cited

U.S. PATENT DOCUMENTS 6,085,168 A * 7/2000 Mori ............... G06Q 20/10 705/17
7,312,707 B1 * 12/2007 Bishop ............... G07C 9/28 343/726

(Continued)

FOREIGN PATENT DOCUMENTS

AU 2007311031 A1 * 6/2009 ........... G06F 21/606
AU 2008210306 A1 * 9/2009 ............. G06Q 20/20

(Continued)

OTHER PUBLICATIONS

A. Armando, A. Merlo and L. Verderame, "Trusted host-based card emulation," 2015 International Conference on High Performance Computing & Simulation (HPCS), 2015, pp. 221-228. https://ieeexplore.ieee.org/document/7237043?source=IQplus (Year: 2015).*

(Continued)

*Primary Examiner* — El Mehdi Oussir
(74) *Attorney, Agent, or Firm* — Leason Ellis LLP

(57) ABSTRACT

A transaction payload is received that represents at least i) a transaction initiated between a merchant and a customer, ii) an identification of the merchant, iii) an amount of the transaction, and iv) a transaction account associated with the customer. The transaction payload is encrypted using the OEM device credential. Thereafter, the transaction payload is decrypted and validated. Furthermore, the transaction payload is encrypted using an issuer credential, and routed via a predetermined payment service provider to a device associated with the issuer. Thereafter, the processor(s) receive from a device associated with the issuer, approval of the transaction, and transmit approval information to the enrolled mobile computing device for notifying the merchant that the transaction is approved.

20 Claims, 9 Drawing Sheets

(56) References Cited

U.S. PATENT DOCUMENTS

| | | | |
|---|---|---|---|
| 7,421,735 B2* | 9/2008 | Kerstens | H04L 63/0464 |
| | | | 713/168 |
| 8,645,677 B2* | 2/2014 | Khosravi | H04L 9/0877 |
| | | | 713/182 |
| 9,262,771 B1* | 2/2016 | Patel | G06Q 30/0237 |
| 9,436,956 B2 | 9/2016 | Jaramillo | |
| 9,892,402 B2* | 2/2018 | Sharma | G06Q 20/12 |
| 9,954,830 B2* | 4/2018 | Barnett | H04L 63/123 |
| 10,148,659 B2 | 12/2018 | Nandakumar | |
| 10,257,495 B1* | 4/2019 | Poder | G06V 40/172 |
| 10,331,291 B1* | 6/2019 | Poder | G06F 21/36 |
| 10,432,618 B1* | 10/2019 | Poder | H04L 63/0861 |
| 10,439,815 B1* | 10/2019 | Poder | H04L 9/3236 |
| 10,826,900 B1* | 11/2020 | Poder | H04L 63/105 |
| 11,257,085 B1* | 2/2022 | Barkas | G06Q 20/401 |
| 11,381,271 B1* | 7/2022 | Zalewski | H04W 76/14 |
| 2009/0044012 A1* | 2/2009 | Bishop | G06Q 20/10 |
| | | | 713/168 |
| 2010/0250944 A1* | 9/2010 | Suzuki | H04L 63/0861 |
| | | | 713/172 |
| 2013/0080764 A1* | 3/2013 | Khosravi | H04L 9/0822 |
| | | | 713/150 |
| 2013/0219481 A1* | 8/2013 | Voltz | H04L 63/20 |
| | | | 726/9 |
| 2013/0226813 A1* | 8/2013 | Voltz | G06Q 20/4014 |
| | | | 705/67 |
| 2013/0262317 A1* | 10/2013 | Collinge | G06Q 20/405 |
| | | | 705/72 |
| 2013/0282438 A1* | 10/2013 | Hunter | G06Q 30/0201 |
| | | | 705/7.32 |
| 2014/0101036 A1 | 4/2014 | Phillips et al. | |
| 2014/0157393 A1* | 6/2014 | Whitcomb | H04L 9/0894 |
| | | | 726/9 |
| 2015/0142670 A1* | 5/2015 | Zloth | G06Q 20/3829 |
| | | | 705/71 |
| 2015/0332262 A1* | 11/2015 | Lingappa | G06Q 20/3823 |
| | | | 705/71 |
| 2015/0372811 A1* | 12/2015 | Le Saint | H04L 63/068 |
| | | | 705/76 |
| 2016/0019536 A1* | 1/2016 | Ortiz | G06Q 20/36 |
| | | | 705/67 |
| 2016/0034990 A1* | 2/2016 | Kannair | H04L 63/083 |
| | | | 705/26.35 |
| 2016/0065370 A1* | 3/2016 | Le Saint | H04L 9/14 |
| | | | 713/155 |
| 2016/0189136 A1* | 6/2016 | Mercille | H04W 12/06 |
| | | | 705/44 |
| 2016/0241389 A1* | 8/2016 | Le Saint | H04L 9/0844 |
| 2017/0063975 A1* | 3/2017 | Prakash | H04L 67/1001 |
| 2017/0116603 A1* | 4/2017 | Bogaard | G06Q 20/02 |
| 2017/0149740 A1* | 5/2017 | Mansour | H04L 63/063 |
| 2017/0357936 A1* | 12/2017 | Byington | H04L 9/085 |
| 2018/0026973 A1* | 1/2018 | Le Saint | H04W 12/069 |
| | | | 713/168 |
| 2018/0139612 A1* | 5/2018 | Rhelimi | H04W 12/08 |
| 2019/0109713 A1* | 4/2019 | Clark | G06F 16/182 |
| 2019/0109714 A1* | 4/2019 | Clark | G06F 21/53 |
| 2019/0109820 A1* | 4/2019 | Clark | H04L 63/0227 |
| 2019/0109821 A1* | 4/2019 | Clark | H04L 63/0414 |
| 2019/0109822 A1* | 4/2019 | Clark | H04L 63/145 |
| 2019/0109848 A1* | 4/2019 | Clark | H04L 9/3228 |
| 2019/0114628 A1* | 4/2019 | Barnett | G06Q 20/4018 |
| 2019/0173883 A1* | 6/2019 | Chandoor | H04L 63/10 |
| 2019/0311185 A1* | 10/2019 | Jones | G06K 7/10722 |
| 2020/0213101 A1* | 7/2020 | Zimmerman | H04L 9/0877 |
| 2022/0067723 A1* | 3/2022 | Deliwala | G06Q 20/3821 |

FOREIGN PATENT DOCUMENTS

| | | | | |
|---|---|---|---|---|
| AU | 2015327722 A1 | * | 4/2017 | G06Q 20/027 |
| CN | 101563870 A | * | 10/2009 | G06F 21/606 |
| CN | 101563882 A | * | 10/2009 | G06F 21/606 |
| CN | 106664523 A | * | 5/2017 | H04L 63/10 |
| CN | 107067251 A | * | 8/2017 | G06Q 20/10 |
| CN | 107077670 A | * | 8/2017 | G06Q 20/3227 |
| CN | 107278307 A | * | 10/2017 | G06F 21/12 |
| CN | 104541474 B | * | 3/2018 | G06F 21/54 |
| CN | 108476227 A | * | 8/2018 | H04L 63/0853 |
| CN | 110060046 A | * | 7/2019 | |
| CN | 113204532 A | * | 8/2021 | G06F 16/1805 |
| DE | 69917803 T2 | * | 8/2005 | H04L 63/08 |
| EP | 0858057 A2 | * | 2/1998 | |
| EP | 2836971 B1 | * | 12/2017 | G06Q 20/204 |
| EP | 3255597 A1 | * | 12/2017 | G06Q 10/087 |
| JP | 2018106707 A | * | 7/2018 | G06F 11/0766 |
| KR | 10-2010-0135249 | | 12/2010 | |
| KR | 20200072559 A | * | 7/2014 | |
| WO | WO-2013163326 A1 | * | 10/2013 | A45C 13/42 |
| WO | WO-2015132559 A1 | * | 9/2015 | G06F 21/606 |
| WO | WO-2015143235 A2 | * | 9/2015 | G06F 11/0766 |
| WO | WO 2015-175696 | | 11/2015 | |
| WO | WO-2015175696 A1 | * | 11/2015 | G06Q 20/322 |
| WO | WO-2015195978 A1 | * | 12/2015 | G06Q 20/3227 |
| WO | WO-2016131056 A1 | * | 8/2016 | H04L 63/061 |
| WO | WO-2016168339 A1 | * | 10/2016 | G06F 21/35 |
| WO | WO-2019071134 A1 | * | 4/2019 | G06F 16/182 |

OTHER PUBLICATIONS

Praveen Kumar Singh et al. Smart Card ID: An Evolving and Viable Technology. (IJACSA) International Journal of Advanced Computer Science and Applications, vol. 9, No. 3, 2018. https://pdfs.semanticscholar.org/ff61/d9795621e40557fd97e0d33692cde032a4c1.pdf (Year: 2018).*

Xue et al., Auditing Anti-Malware Tools by Evolving Android Malware and Dynamic Loading Technique. https://ink.library.smu.edu.sg/cgi/viewcontent.cgi?article=5856&context=sis_research (Year: 2017).*

* cited by examiner

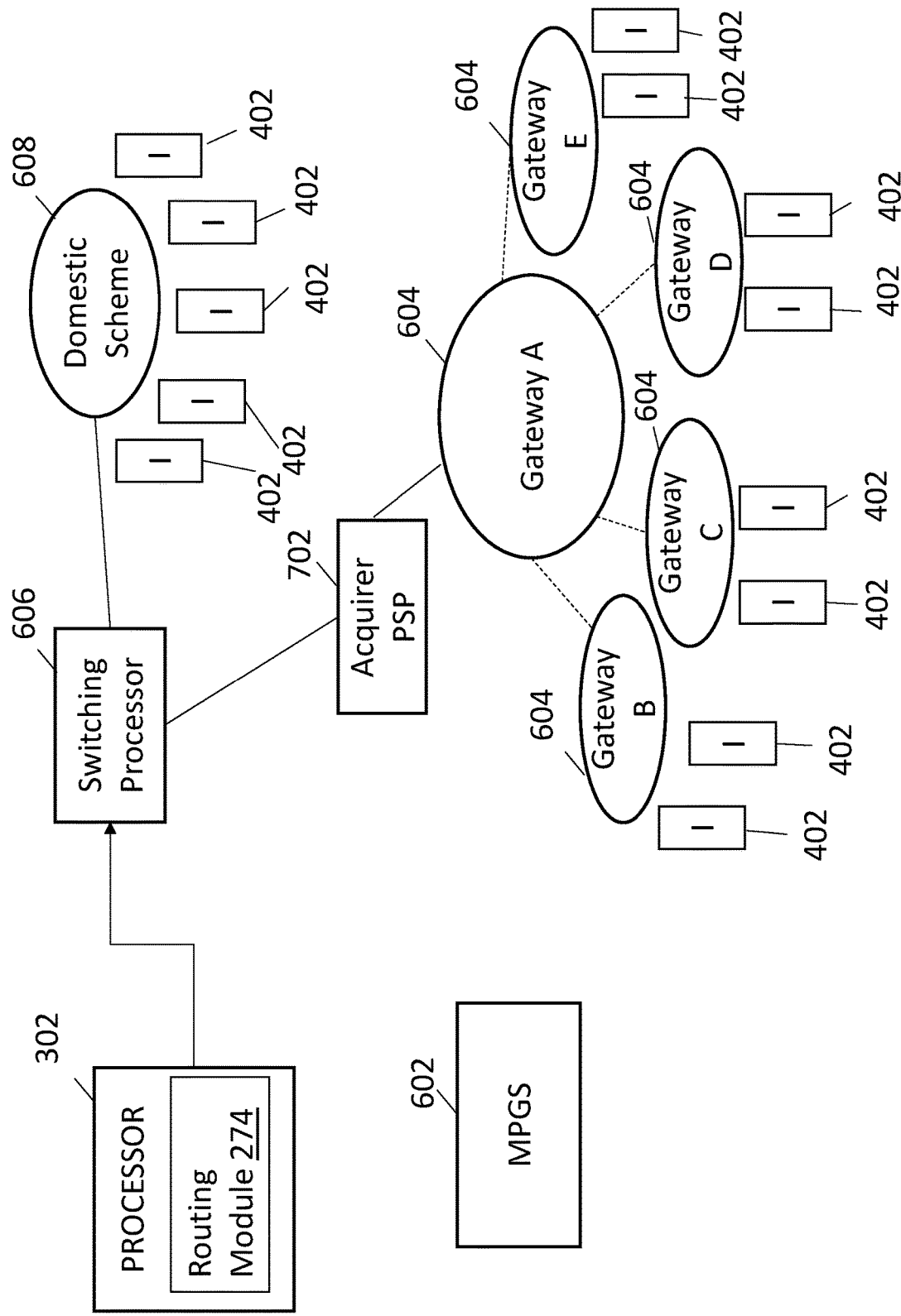

SYSTEM AND METHOD TO SUPPORT PAYMENT ACCEPTANCE CAPABILITY FOR MERCHANTS

CROSS-REFERENCE TO RELATED PATENT APPLICATIONS

This application is based on and claims priority to U.S. Provisional Patent Application 62/882,331, filed Aug. 2, 2019, the entire contents of which is incorporated by reference herein as if expressly set forth in its respective entirety herein.

BACKGROUND OF THE DISCLOSURE

Payment options for consumers continue to expand in the world of commerce. Consumers were previously limited to payment with cash, credit cards, and/or debit cards, and consumers now also have the option to pay using an electronic device (e.g., digital wallet) that is linked to the consumer's bank account or credit card account, for example. Some point-of-sale terminals accommodate payment with electronic devices, but such point-of-sale terminals are expensive and can be cost-prohibitive, particularly for certain smaller merchants.

Some merchants have recently used physical device payment card readers such as the SQUARE® Reader. Such readers are typically configured as attachable hardware (e.g., a dongle) for a mobile device that can process payments via a card and/or an electronic device. While these readers are less expensive than conventional point-of-sale terminals, the readers may still require small merchants to purchase and/or license additional hardware and/or software in order to process their payments. Moreover, such hardware often needs to be installed and integrated with an existing computing device of the merchant.

As such, what is desired is a system for processing payments that does not require the purchase of point-of-sale terminals or additional third-party hardware. It is with respect to these and other considerations that the disclosure made herein is presented.

SUMMARY OF THE DISCLOSURE

In one or more implementations, a system and method are provided for configuring a mobile computing device to operate as a point of sale terminal. At least one processor provides software that configures each of a plurality of mobile computing devices for enrollment. The enrollment configures the plurality of mobile computing devices to transmit, to the at least one processor, at least a respective original equipment manufacturer (OEM) device credential and transmit, to the at least one processor, merchant information representing an identification of a respective merchant associated with a respective mobile computing device, and at least one preference associated with the respective merchant. Completion of enrollment configures the plurality of mobile computing devices as enrolled mobile computing devices. The at least one processor receives from an enrolled mobile computing device a transaction payload including transaction information representing at least i) a transaction initiated between a merchant and a customer, ii) an identification of the merchant, iii) an amount of the transaction, and iv) a transaction account associated with the customer. The transaction payload is encrypted using at least the OEM device credential. Thereafter, the at least one processor decrypts the transaction payload using at least the OEM device credential, and the at least one processor validates information in the transaction payload with information received from an issuer of the transaction account. Furthermore, the at least one processor encrypts the transaction payload using an issuer credential that is associated with the issuer, and routs via a predetermined payment service provider the transaction payload that is encrypted with the issuer credential to a device associated with the issuer. Thereafter, the at least one processor receives from the device associated with the issuer, approval of the transaction, and transmits approval information to the enrolled mobile computing device for notifying the merchant that the transaction is approved.

According to a further aspect of the disclosure, the transaction payload further includes a personal identification number (PIN) associated with the transaction account, and validating the transaction account includes transmitting the PIN to the device associated with the issuer.

According to a further aspect of the disclosure, in response to transmitting the PIN the at least one processor receives from the device associated with the issuer the issuer credential.

According to a further aspect of the disclosure, validating the information in the transaction payload is by identifying the merchant from the transaction information and verifying the identified merchant as an authorized merchant as a function of at least one merchant on-boarding process.

According to a further aspect of the disclosure, the at least one merchant on-boarding process includes accessing, by the at least one processor, a database that includes information representing: a plurality of merchants associated with enrolled mobile computing devices; a respective acquirer associated with at least one of the plurality of merchants associated with the enrolled mobile computing devices; and a respective value-added service associated with at least one of the plurality of merchants associated with the enrolled mobile computing devices.

According to a further aspect of the disclosure, the at least one processor determines the predetermined payment service provider as a function of the at least one preference in the merchant information.

According to a further aspect of the disclosure, the predetermined payment service provider includes Mastercard payment gateway services.

According to a further aspect of the disclosure, the merchant information further includes acquirer information representing at least one acquiring management and settlement institution.

According to a further aspect of the disclosure, the merchant information further includes one or more value-added services that include at least one of: security services, loyalty-based services, and text notification services.

According to a further aspect of the disclosure, the security services include at least one of tokenization, authentication, and fraud management.

According to a further aspect of the disclosure, an enrolled mobile computing device is mapped to at least one preference associated with a respective merchant.

According to a further aspect of the disclosure, the mapping is in accordance with a database.

According to a further aspect of the disclosure, the at least one processor stores at least one of the OEM device credential, the issuer credential, and the merchant information in a database.

According to a further aspect of the disclosure, the predetermined payment service provider performs direct issuer routing of the transaction payload that is encrypted with the issuer credential to a computing device associated with the issuer.

According to a further aspect of the disclosure, the predetermined payment service provider transmits the transaction payload that is encrypted with the issuer credential to a computing device associated with the issuer via a gateway associated with the transaction account.

According to a further aspect of the disclosure, the predetermined payment service provider transmits the transaction payload that is encrypted with the issuer credential to a switching processor, and further wherein the switching processor transmits the transaction payload that is encrypted with the issuer credential to a computing device associated with the issuer.

According to a further aspect of the disclosure, the predetermined payment service provider receives settlement information representing payment by the issuer, and further wherein the predetermined payment service provider transmits at least some of the settlement information to an acquirer of the merchant.

According to a further aspect of the disclosure, the predetermined payment service provider transmits to a switching processor settlement information representing payment by the issuer, and further wherein the switching processor transmits at least some of the settlement information to an acquirer of the merchant.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

FIG. 9 is a block diagram illustrating the routing of an encrypted transaction payload using an acquirer payment service provider (PSP) or other PSP in connection with the method for configuring the mobile computing device to operate as a point of sale terminal in accordance with at least one embodiment disclosed herein.

DESCRIPTION OF CERTAIN EMBODIMENTS OF THE DISCLOSURE

Figure 1:
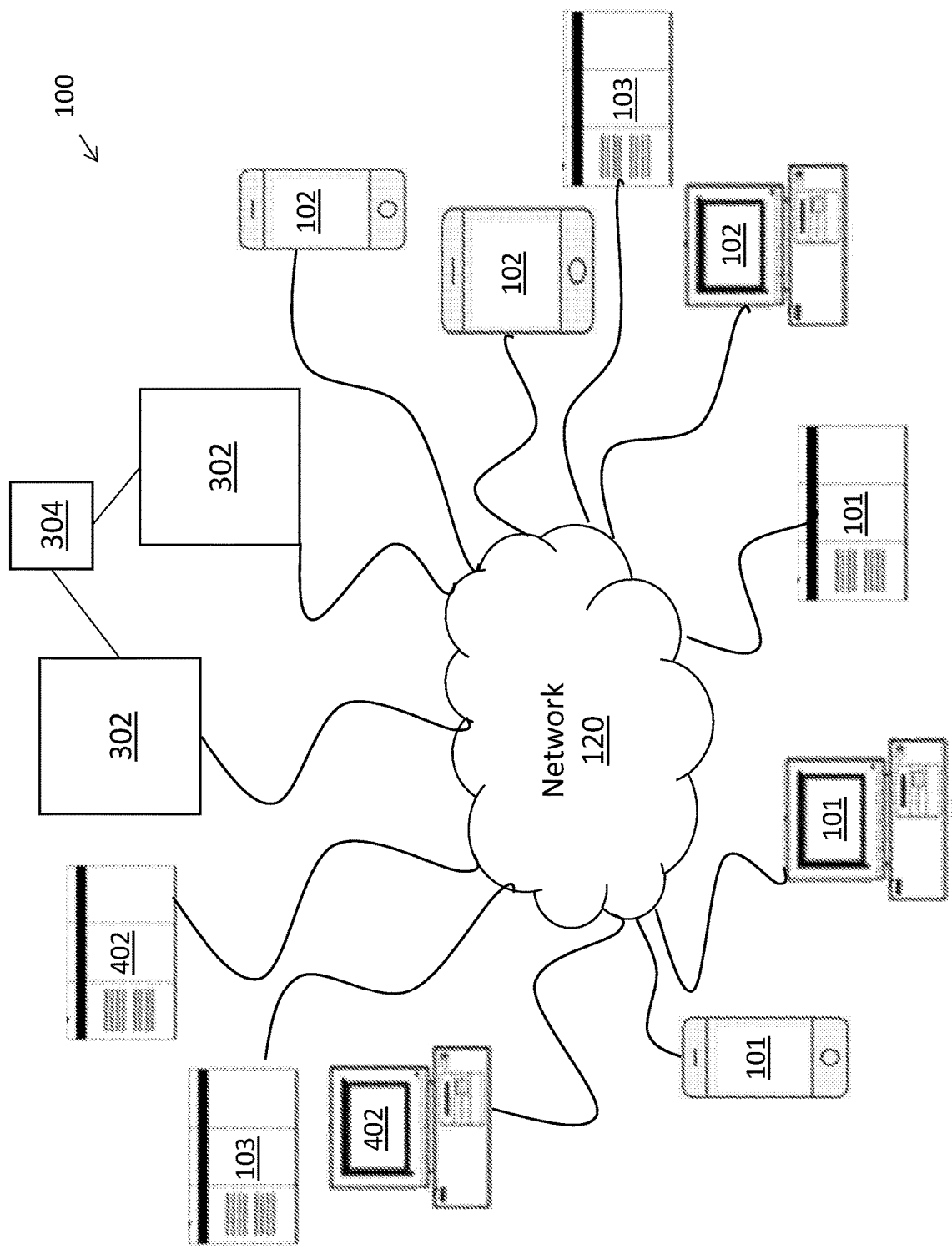
FIG. 1 is a high-level diagram illustrating an example information managing system that receives and conveys a variety of information types between a plurality of system components for configuring a mobile computing device to operate as a point-of-sale terminal and to process payment information in accordance with at least one embodiment disclosed herein.

By way of overview and introduction, various systems and methods are described herein for providing an interactive platform that includes configuring a mobile computing device to operate as a point-of-sale terminal. Moreover, the present disclosure includes a system and method that supports the features without requiring merchant devices to obtain and configure additional hardware separate from the mobile computing device.

In one or more implementations, the systems and methods described herein include at least software to configure a mobile computing device associated with a merchant to operate as a point-of-sale terminal. The so-configured devices can enroll as point-of-sale terminals in the interactive data platform and receive payment information from a customer. The so-configured devices can further provide payment information to the interactive data processing platform to which the device associated with the merchant has enrolled.

More particularly, upon enrollment, each mobile computing device can be configured to receive payments from a customer directly via a contactless transaction. The devices, which can include, for example, smartphones, can receive payments without the use of additional hardware such as a dongle. Payments can be made via a contactless transaction simply by a tap of the electronic device to access a digital wallet or credit card information of the customer. Alternatively, credit card information can be manually provided in an application running on the merchant's mobile computing device. Prior to receiving a payment, a software application ("app") executing on a mobile computing device associated with a merchant can automatically and/or manually cause operations of the merchant device to switch to a preferred mode of payment by a customer. For example, one customer and/or merchant may prefer a contactless payment method while another customer may prefer a consumer presented quick response ("QR") code, a merchant presented QR code, stored credit card information from a file, or the like. In this way, the app can configure merchant devices to accommodate particular customer preferences in connection with payment options.

In one or more implementations the app can further prompt for a consumer to enter additional authentication information, such as a card personal identification number ("PIN") or the like. This feature can be particularly useful for payment options such as contactless transaction, manual entry of credit card information, credit card information stored on file, or the like.

Once received, payment information is transmitted to the processor and can be formatted as an encrypted transaction payload. The processor, which can be, for example, a server computer, can receive encrypted transaction payloads from various enrolled mobile computing devices and process the encrypted payment transaction payloads to effect payment. The encrypted transaction payloads can include transaction information related to a pending transaction between the merchant and a customer. For example, the encrypted transaction payload can include an amount of the transaction, a transaction account associated with the customer, and information associated with the enrolled merchant device. The processor can also be configured to process the payload via a plurality of modules, including to decrypt the transaction payload and validate a specific transaction amount by using information received from a respective issuer of a transaction account. Once validated, the transaction payload can be encrypted again, this time using a credential associated with the issuer (referred to herein, generally, as an "issuer credential"). Thereafter, the transaction payload can be further routed for further processing and approval. Upon approval of the transaction, the processor receives a communication or notification and transmits information to the merchant's enrolled mobile computing device representing that the transaction has been approved.

More particularly, a merchant device can execute a set of development tools, such as included in a client-based software development kit ("SDK"), in order to perform various tasks, such as, but not limited to, a device integrity check. Enrollment processes, including any registration processes, can be initiated for the device provided the results of the integrity check are successful. For example, device and/or merchant keys can be generated for payload encryption purposes, such as shown and described herein.

Thus, and as further shown and described herein, the present systems and methods provide an efficient and inexpensive solution for merchants operating mobile computing devices to convert their devices to operate as point-of-sale terminals, and thereby to receive payments (e.g., credit payments) from customers. The present systems and methods provide merchants with a one-stop solution for acceptance of multiple forms of payments (e.g., contactless, QR, card-on-file (COF), manual entry) through seamless SDK integration. The present systems and methods also provide a layered channel for driving transaction processing capabilities for transactions via various payment networks.

The systems and methods for configuring a mobile computing device to operate as a point-of-sale terminal are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather, are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

Referring now to the drawings figures in which like reference numerals refer to like elements, there is shown in FIG. 1 a diagram of an example hardware arrangement that operates for providing the systems and methods disclosed herein, and designated generally as system 100.

As used herein, "processor" or "computer" refers one or more electronic devices (e.g., semiconductor-based microcontrollers) configured with code in the form of software, to execute a given instruction set. For example, the administrative server(s), database(s) and remote computers, include one or more processing or computing elements executing commercially available or custom operating system, e.g., MICROSOFT WINDOWS, APPLE OSX, UNIX or Linux based operating system implementations. In other implementations, administrative server, database(s) and remote computers each include custom or non-standard hardware, firmware or software configurations. For instance, the processor or computer can include one or more of a collection of micro-computing elements, computer-on-chip, field programmable gate arrays, graphical processing units, or other processing elements. Such computing elements are connected, directly or indirectly, to one or more memory storage devices (memories) to form a microcontroller structure. The memory can be a persistent or non-persistent storage device that is operative to store an operating system for the processor in addition to one or more of software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules.

The computer memories may also comprise secondary computer memory, such as magnetic or optical disk drives or flash memory, that provide long term storage of data in a manner similar to the persistent memory device. In one or more embodiments, the memory of the processors provides for storage of application programs and data files when needed.

The processors or computers described are configured to execute code written in a standard, custom, proprietary or modified programming language such as a standard set, subset, superset or extended set of JavaScript, PHP, Ruby, Scala, Erlang, C, C++, Objective C, Swift, C#, Java, Assembly, Go, Python, Perl, R, Visual Basic, Lisp, TensorFlow for ML, mClust, or Julia or any other object oriented, functional or other paradigm based programming language.

As shown in FIG. 1, in one or more implementations the system 100 includes one or more merchant mobile computing devices 101, one or more customer payment devices 102, at least one information processor 302, and one or more issuer computing devices 402. In one or more implementations, the one or more devices 101, 102, 302, and 402 can be configured as servers, mobile computing devices (e.g., smartphones), tablets, laptop computing devices, desktop computing devices, or the like. More particularly, the at least one information processor 302 can be a server, computing cluster, cloud platform or computing array, and configured to directly, or through a communication linkage, communicate and exchange data with the one or more remote computers.

Further, the information processor 302 can be a server configured by code executing therein to accept electronic data queried from one of more remote data storage locations (i.e. database 304) and evaluate the queried or accessed data according to pre-determined or dynamic rules, logic, instructions or algorithms. The information processor 302 is further configured with one or more remote or local data storage devices that store operating code. The information processor 302 is also configured to access remote resources via network connections (network 120), including but not limited to the programmatic use of third party application programming interfaces (API).

In one or more implementations, the information processor 302 is configured to evaluate information of the database(s) 304 and, based on the evaluation, generate new information or provide references to particular items for storage in the database 304 or transmission to a remote computer. For example, the content stored or referenced in the database 304 can be accessed by the information processor 302. The accessed data can then be represented based on one or more data processing routines into visualizations suitable for a user of the merchant mobile computing device 101, customer payment device 102, issuer computing device 402, and/or other remote devices (not shown) to interact with the data in a way to actively manage or evaluate the content to assess or comprehend interactions between and among the data.

In one or more implementations, the database(s) 304 is one or more datastores in communication with at least one processor of the administrative server. The physical structure of the database(s) 304 may be embodied as solid-state memory (e.g., ROM), hard disk drive systems, RAID, disk arrays, storage area networks ("SAN"), network attached storage ("NAS") and/or any other suitable system for storing computer data. In addition, the database 304 may comprise caches, including database caches and/or web caches. Programmatically, the database 304 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 304 includes the necessary hardware and software to enable information processor 302 to retrieve and store data within the database 304.

Continuing with FIG. 1, the merchant mobile computing device 101, customer payment device 102, issuer computing device 402, and/or other remote devices (collectively, referred to generally as "remote computing devices") are used to exchange data, such as electronic messages, data packets, packages, streams or files, directly or indirectly with the information processor 302. In at least one implementation, the remote computing devices can connect to the administrative server directly, such through an internal local network. Alternatively, the remote computing devices connect to the information processor 302 by first connecting to the Internet (network 120). As used herein, the remote computing devices can be general or single purpose computing devices configured by hardware or software modules to connect to a network and receive data from the administrative server. For example, the customer payment device 102 is a personal communication device (i.e. smartphone, tablet computer, etc.), portable computing device (i.e. laptop or notebook computer) or workstation configured by one or more code modules to exchange data with the administrative server. The remote computer utilizes wired or wireless communication means, such as, but not limited to CDMA, GSM, Ethernet, Wi-Fi, Bluetooth, USB, serial communication protocols, digital input/output pins, eSATA, parallel ports, FIREWIRE, Wi-Fi, or other communication interfaces. and hardware to connect to one or more access points, exchanges, network nodes or network routers. In a particular configuration, the remote computing devices are configured, through hardware and software modules, to connect to more remote servers, computers, peripherals or other hardware using standard or custom communication protocols and settings (e.g., TCP/IP, etc.) either through a local or remote network or through the Internet. In one implementation, remote computer(s) can be devices such as Apple iPad/iPhones®, Android® devices or other electronic devices executing a commercially available or custom operating system, e.g., MICROSOFT WINDOWS, APPLE OSX, UNIX or Linux based operating system implementations. In other implementations, remote access devices are, or include, custom or non-standard hardware, firmware or software configurations.

System 100 preferably includes software that provides functionality described in greater detail herein, and preferably resides on one or more information processors (e.g., information processor 302) and/or various remote computing devices 101, 102, and 402. One of the functions performed by information processor 302 is that of operating as a web server and/or a web site host. Information processor 302 typically communicates with a communication network across a permanent i.e., unswitched data connection. Permanent connectivity ensures that access to information processor 302 is always available.

Figure 2:
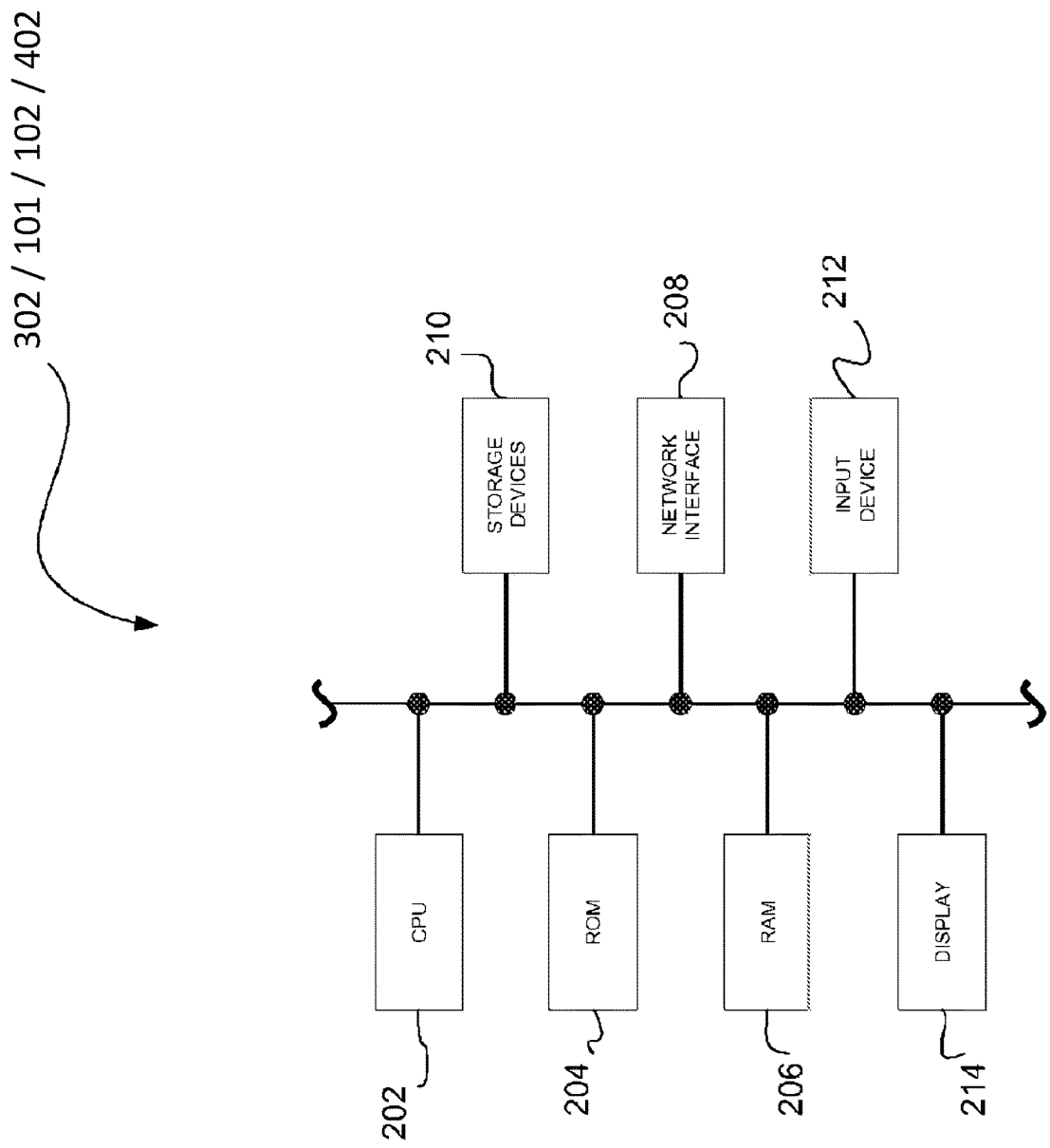
FIG. 2 illustrates the functional elements of an example information processor and/or remote computing devices in accordance with at least one embodiment disclosed herein.

As shown in FIG. 2 the functional elements of each information processor 302 and/or remote computing devices 101, 102, and 402 preferably include one or more central processing units (CPU) 202 used to execute software code in order to control the operation of information processor 302, read only memory (ROM) 204, random access memory (RAM) 206, one or more network interfaces 208 to transmit and receive data to and from other computing devices across a communication network, storage devices 210 such as a hard disk drive, floppy disk drive, tape drive, CD-ROM or DVD drive for storing program code, databases and application code, one or more input devices 212 such as a keyboard, mouse, track ball and the like, and a display 214.

The various components of information processor 302 need not be physically contained within the same chassis or even located in a single location. For example, as explained above with respect to databases that can reside on storage device, storage device may be located at a site which is remote from the remaining elements of information processors, and may even be connected to CPU across communication network via network interface.

The functional elements shown in FIG. 2 (designated by reference numbers 202-214) are preferably the same categories of functional elements preferably present in remote computing devices 101, 102, 402. However, not all elements need be present, for example, storage devices in the case of PDAs, and the capacities of the various elements are arranged to accommodate expected user demand. For example, CPU in remote computing devices 101, 102, 402 may be of a smaller capacity than CPU as present in information processor 302. Similarly, it is likely that information processor 302 will include storage devices of a much higher capacity than storage devices present in remote computing devices 101, 102, 402. Of course, one of ordinary skill in the art will understand that the capacities of the functional elements can be adjusted as needed.

The nature of the present disclosure is such that one skilled in the art of writing computer executed code (software) can implement the described functions using one or more or a combination of a popular computer programming language, including, but not limited to, C++, VISUAL BASIC, JAVA, ACTIVEX, HTML, XML, ASP, SOAP, IOS, ANDROID, TORR, Ruby, Python, Ruby on Rails, SAAS and PHP, and various web application development environments.

As used herein, references to displaying data on remote computing devices 101, 102, 402 refer to the process of communicating data to the remote computing devices 101, 102, 402 across a communication network and processing the data such that the data can be viewed on the remote computing devices 101, 102, 402 displays using a web browser or the like. The display screens on remote computing devices 101, 102, 402 can present areas within system 100 such that a user can proceed from area to area within the system by selecting a desired link. Therefore, each user's experience with system 100 will be based on the order with which (s)he progresses through the display screens. In other words, because the system 100 is not completely hierarchical in its arrangement of display screens, users can proceed from area to area without the need to "backtrack" through a series of display screens. For that reason and unless stated otherwise, the following discussion of the components of system is not intended to represent any sequential operation steps.

Although the present disclosure is described by way of example herein in terms of a web-based system using web browsers and a web site server (e.g., information processor 302), and with remote computing devices 101, 102, 402, system 100 is not limited to that particular configuration. It is contemplated that system 100 can be arranged such that remote computing devices 101, 102, 402 can communicate with, and display data received from, information processor 302 using any known communication and display method, for example, using a non-Internet browser Windows viewer coupled with a local area network protocol such as the Internetwork Packet Exchange (IPX). It is further contemplated that any suitable operating system can be used on the remote computing devices 101, 102, 402, including any suitable PDA or palm computer operating system, if applicable.

The operation of the present systems via processor 302 and the various elements and components of system 100 described above are further appreciated with reference to the methods for configuring a mobile computing device to operate as a point-of-sale terminal described below and with continued reference to FIGS. 1-2.

It should be appreciated that several of the logical operations described herein are implemented (1) as a sequence of computer implemented acts or program modules running on the various devices of the system 100 and/or processor 302 and/or (2) as interconnected machine logic circuits or circuit modules within the system. The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 5:
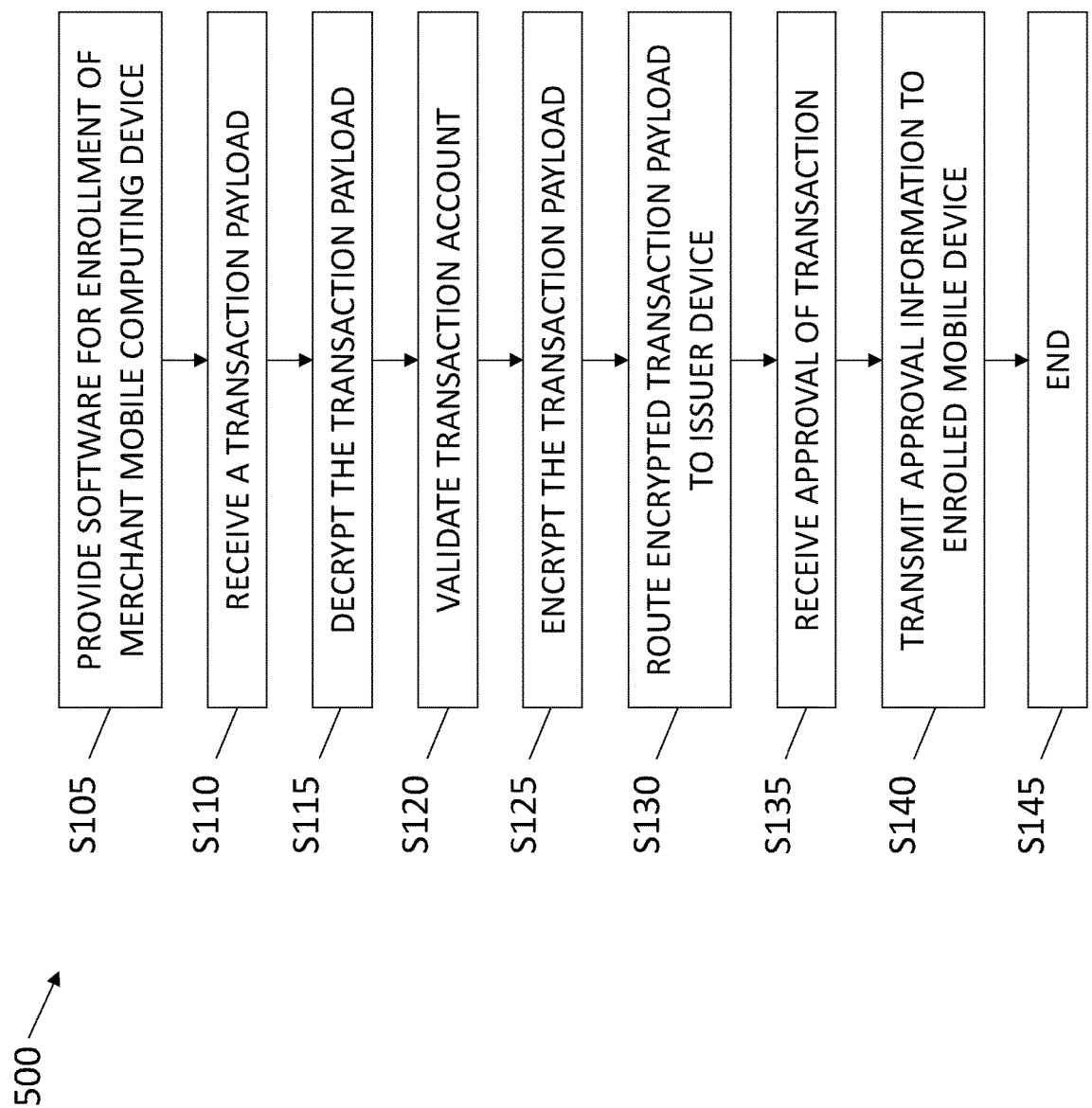
FIG. 5 is a flow diagram showing a method for configuring a mobile computing device to operate as a point of sale terminal in accordance with at least one embodiment disclosed herein.

FIG. 5 is a flow diagram illustrating a routine 500 for configuring a mobile computing device to operate as a point-of-sale terminal in accordance with at least one embodiment disclosed herein. As a non-limiting practical example, routine 500 is described in the context of processing a payment via a mobile computing device operating as a point-of-sale terminal, where the mobile computing device is associated with the merchant A. However, it should be understood that the disclosed embodiments can similarly be applied to other types of transaction processing operations. Further, as a non-limiting practical example, routine 500 is described as being performed, at least in part, by the processor 302. However, it should be understood that in certain implementations, the routine 500 can be performed using one or more processors.

In one or more implementations, the routine 500 begins at step S105, where the processor 302 is configured by executing one or more software modules 230, including merchant enrollment module 270 and/or VAS module 276, to provide software to each of a plurality of mobile computing devices 101. The provided software can configure each of the plurality of mobile computing devices 101 for enrollment as a point-of-sale terminal. Enrollment of each of the plurality of mobile computing devices 101 configures each mobile computing device 101 to transmit at least a respective original equipment manufacturer (OEM) device credential to the processor 302. The OEM device credential is used to encrypt the transaction payload from the customer before it received by the processor 302 as discussed in further detail below.

Figure 4:
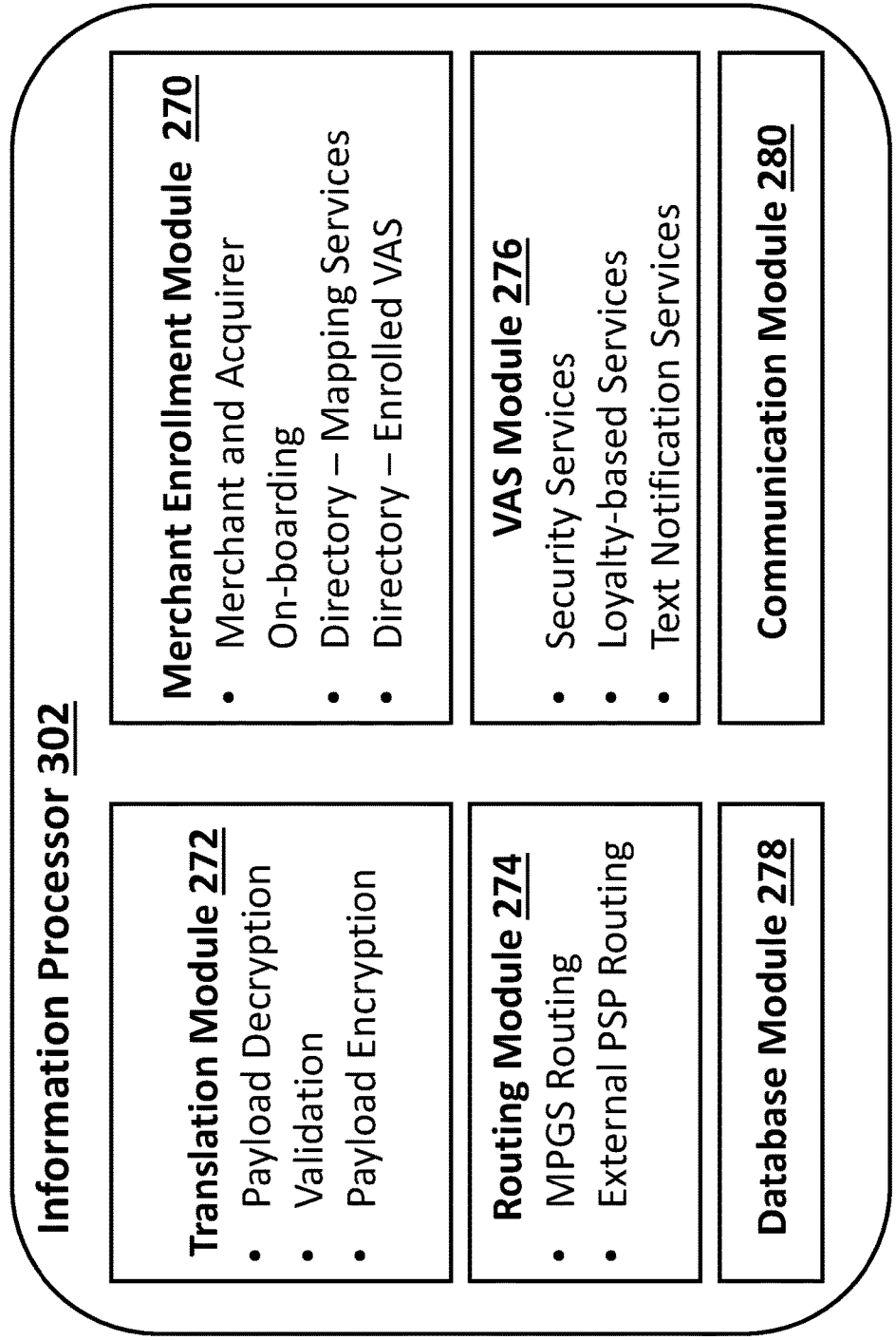
FIG. 4 is a block diagram illustrating the information processor and various modules executed by the processor in connection with the method for configuring the mobile computing device to operate as a point of sale terminal in accordance with at least one embodiment disclosed herein.

Enrollment also configures each of the plurality of mobile computing devices 101 to transmit merchant information and at least one preference associated with a respective merchant to the at least one processor 302. Merchant information can include, for instance, an identification of a respective merchant associated with a respective mobile computing device. In one or more embodiments, the merchant information can also include acquirer information representing at least one acquiring management and settlement institution. The at least one preference associated with the respective merchant can include value added services (VAS), such as security VAS (e.g., authentication, tokenization, fraud), loyalty-based VAS (e.g., merchant-funded rewards [MFR], installments), and text notification VAS. See, for example, FIG. 4. After a merchant has opted in, for example, for text notification VAS, post-transaction processing, such as resulting from an issuer, can be implemented by one or more modules associated with the present disclosure to cause notifications to be sent automatically to merchant(s) as well consumer(s).

In one or more implementations, the software provided to each of the mobile computing devices 101 can be a mobile application ("app"), which is designed to operate on particular devices and/or operating systems. For example, a device operating the APPLE IOS will use an app configured for that operating system, while a device operating the ANDROID operating system will use a different app. Further, the apps can be further configured via an OEM certificate and, accordingly, be configured as OEM apps. Thus, in one or more implementations, upon enrollment, each of the plurality of mobile computing devices 101 can be configured to execute an OEM-based app for receiving payments from a customer. In other words, following step S105, each of the plurality of mobile computing devices 101 are configured as "enrolled" mobile computing devices for receiving payments from a customer.

Figure 3:
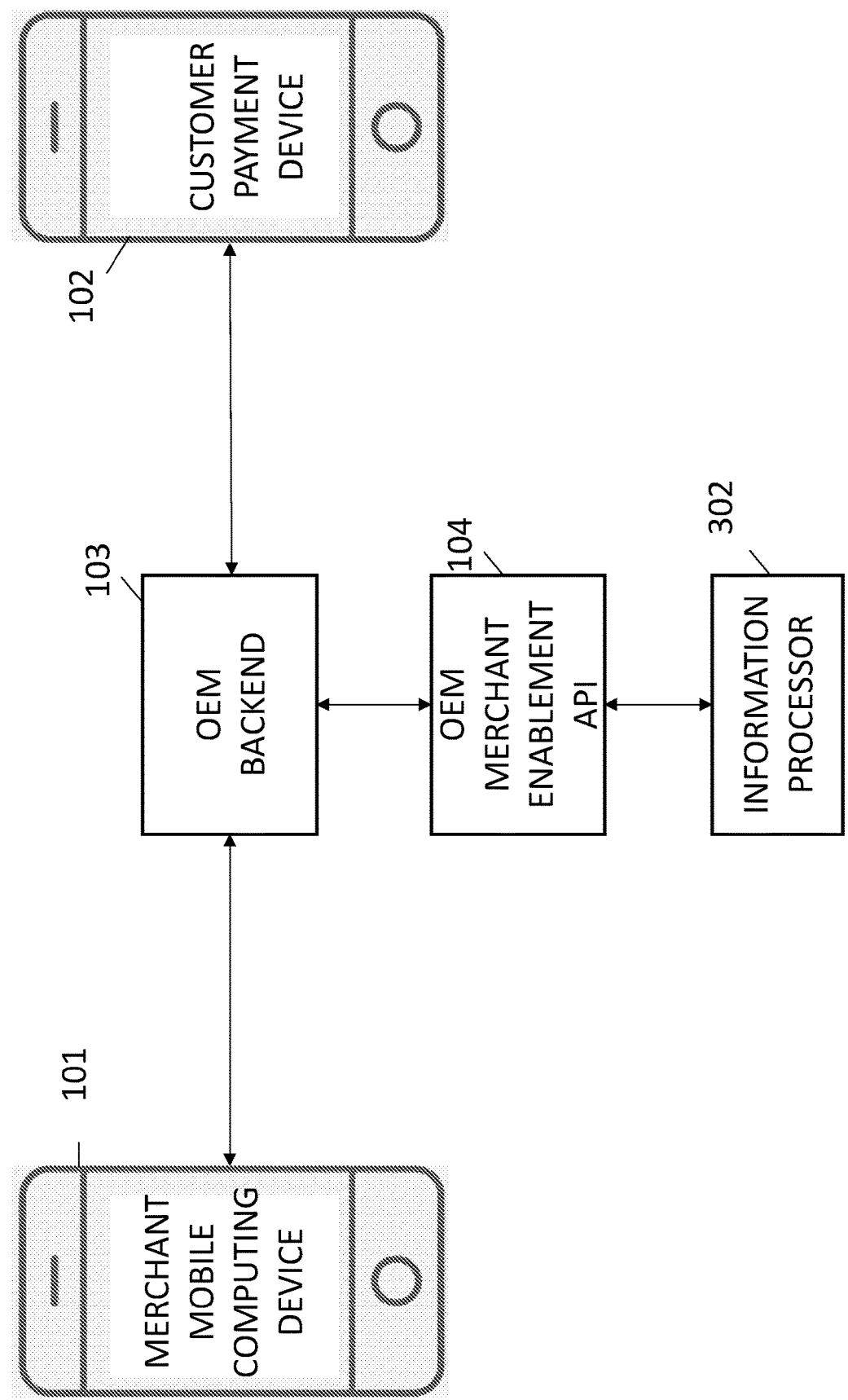
FIG. 3 is a block diagram illustrating the connection between the merchant mobile computing device and the information processor for facilitating the method for configuring the mobile computing device to operate as a point-of-sale terminal in accordance with at least one embodiment disclosed herein.

It should be understood that in the accordance with one or more implementations of the routine 500, transmissions between the mobile computing device(s) 101 and the processor 302 can be passed through an OEM backend server 103, such as the example shown in FIG. 3. For instance, in one or more implementations a mobile computing device 101 can transmit the OEM device credential to the OEM backend server for use to encrypt a transaction payload. Similarly, transmissions between the mobile computing device 101 and the customer payment device 102 (e.g., via a digital wallet, payment card) can also pass through the OEM backend server 103. It should also be noted that, in one or more implementations, the mobile computing device 101, the customer payment device 102, and/or the processor 302 are enabled to communicate (i.e., transmit signals) between one another using the OEM merchant enablement API 104.

Returning now to FIG. 5, at step S110 of routine 500, the processor 302 is configured by executing one or more software modules 230 to receive a transaction payload an enrolled mobile computing device 101. As discussed above, once a particular mobile computing device 101 is enrolled at step S105, the enrolled mobile computing device 101 is configured for receiving payments from a customer. For a given transaction with a customer using the enrolled mobile computing device 101, a transaction payload is received from the customer via the customer payment device 102. In one or more embodiments, the customer payment device 102 can be a near-field communication (NFC) equipped device (e.g., card or digital wallet) or a QR code presented by the customer. For example, in at least one embodiment, a digital wallet can transmit the transaction payload through a scan of a dynamic QR code generated by an SDK operating on the enrolled mobile computing device 101. In at least one embodiment, the transaction payload can be transferred to the enrolled mobile computing device 101 by manual entry of payment card numbers on the enrolled mobile computing device 101, stored credit card information from a file (card-on-file), or the like. Prior to or when the processor 302 receiving the transaction payload, the mobile computing device 101 can transmit the OEM device credential and the transaction payload to the OEM backend server where the OEM device credential is used to encrypt the transaction payload.

In one or more implementations, the transaction payload can include transaction information representing one or more aspects of a transaction between a customer and the merchant associated with the enrolled mobile computing device 101. For instance, the transaction information can include information representing a transaction between the associated merchant and the customer, an identification of the associated merchant, an amount of the transaction, and/or a transaction account (e.g., bank account, credit card account) associated with the customer. Further, the transaction payload can include a personal identification number (PIN) associated with the transaction account associated with the customer for future validation as discussed in further detail below. During backend processing, if a PIN is presented then the translation (or other) module can perform PIN translation and/or PIN validation with the issuer. Determining that a PIN is valid furthers the process, including for encrypting the payload with the issuer key, such as shown and described herein.

With continued reference to FIG. 5, at step S115, processor 302 is configured by executing one or more software modules 230, including translation module 272, to decrypt the transaction payload. In one or more implementations, the transaction payload is decrypted using at least the OEM device credential.

At step S120, the processor 302 is configured by executing one or more software modules 230, including translation module 272, to validate the transaction account included in the transaction payload. In one or more implementations, the processor 302 is configured to validate the transaction account with information received from an issuer of the transaction account (e.g., bank, credit union). For example, in one or more implementations, the step of validating the transaction account can be initiated by the processor 302 transmitting the PIN associated with the transaction account to a device associated with the issuer ("issuer device") 402.

As discussed above, the PIN can be received by the processor 302 as part of the transaction information of the transaction payload. In response to transmitting the PIN to the issuer device 402, the processor 302 can then receive an issuer credential from the issuer device 402 if the issuer device 402 verifies that the transmitted PIN corresponds to the associated transaction account. However, if the issuer device 402 determines that the transmitted PIN does not correspond to the associated transaction account, the processor 302 will receive an error message from the issue device 402 indicating that the transaction account cannot be validated. If the processor receives an error message from the issuer device 402, the processor 302 can then be configured to transmit a corresponding error message to the enrolled mobile computing device 101 indicating that the transaction account cannot be validated. In one or more implementations, this can prompt the enrolled mobile computing device 101 to display a message to the customer that a different (correct) PIN must be submitted to validate the transaction account.

As part of validating the transaction account, the processor 302 executing one or more software modules 230, can be configured to identify a merchant using the transaction information of the transaction payload, and verify that the identified merchant is an authorized merchant. In other words, the processor 302 can be configured to verify that the merchant identified in the transaction information corresponds to the enrolled mobile computing device 101 that transmitted the transaction payload to the processor 302.

In one or more implementations, the identification of the merchant and the verification that the merchant is an authorized merchant can be a function of at least one merchant on-boarding process. For instance, with reference to FIG. 4, in one or more implementations, a merchant on-boarding process can include the processor 302 accessing at least one database (e.g., database 304, see FIG. 1) that includes information related to merchants (merchant information). Specifically, in one or more implementations, the at least one database can include a plurality of merchants that are each associated with an enrolled mobile computing device 101. The at least one database can include a respective acquirer associated with at least one of the plurality of merchants that is associated with the enrolled mobile computing devices 101. Further, the at least one database can store a respective value-added service (VAS) associated with at least one of the plurality of merchants associated with the enrolled mobile computing devices 101. VAS that are opted in by the merchant can be invoked during or prior to invocation of processing.

The information included in at least one database can be in the form of one or more directories. In one or more implementations, an enrolled mobile computing device can be mapped to at least one of the preferences associated with the respective merchant. This mapping can be associated with the at least one database accessible by the processor 302. Further, in one or more implementations, the processor 302 can be configured to store at least one of the merchant information, the OEM device credential, and the issuer credential in one or more databases.

With reference again to FIGS. 4 and 5, upon validation of the transaction account, the processor 302 is configured by executing one or more software modules 230, including translation module 272, to encrypt the transaction payload using the issuer credential (step S125). As mentioned above, in one or more implementations the processor 302 can receive an issuer credential from the issuer device 402 if the issuer device 402 verifies that the transmitted PIN corresponds to the associated transaction account. With the issuer credential, the processor 302 is then configured to encrypt the transaction payload before it is routed to subsequent computing devices/servers.

Continuing with reference to FIG. 5, step S130, the processor 302 configured by executing one or more software modules 230, including routing module 274, routes the transaction payload encrypted with the issuer credential to the issuer device 402. The transaction payload encrypted with the issuer credential can further be routed to the issuer device 402 via a predetermined payment service provider. In one or more embodiments, the predetermined payment service provider can be integrated and/or associated with the processor 302.

Figure 6:
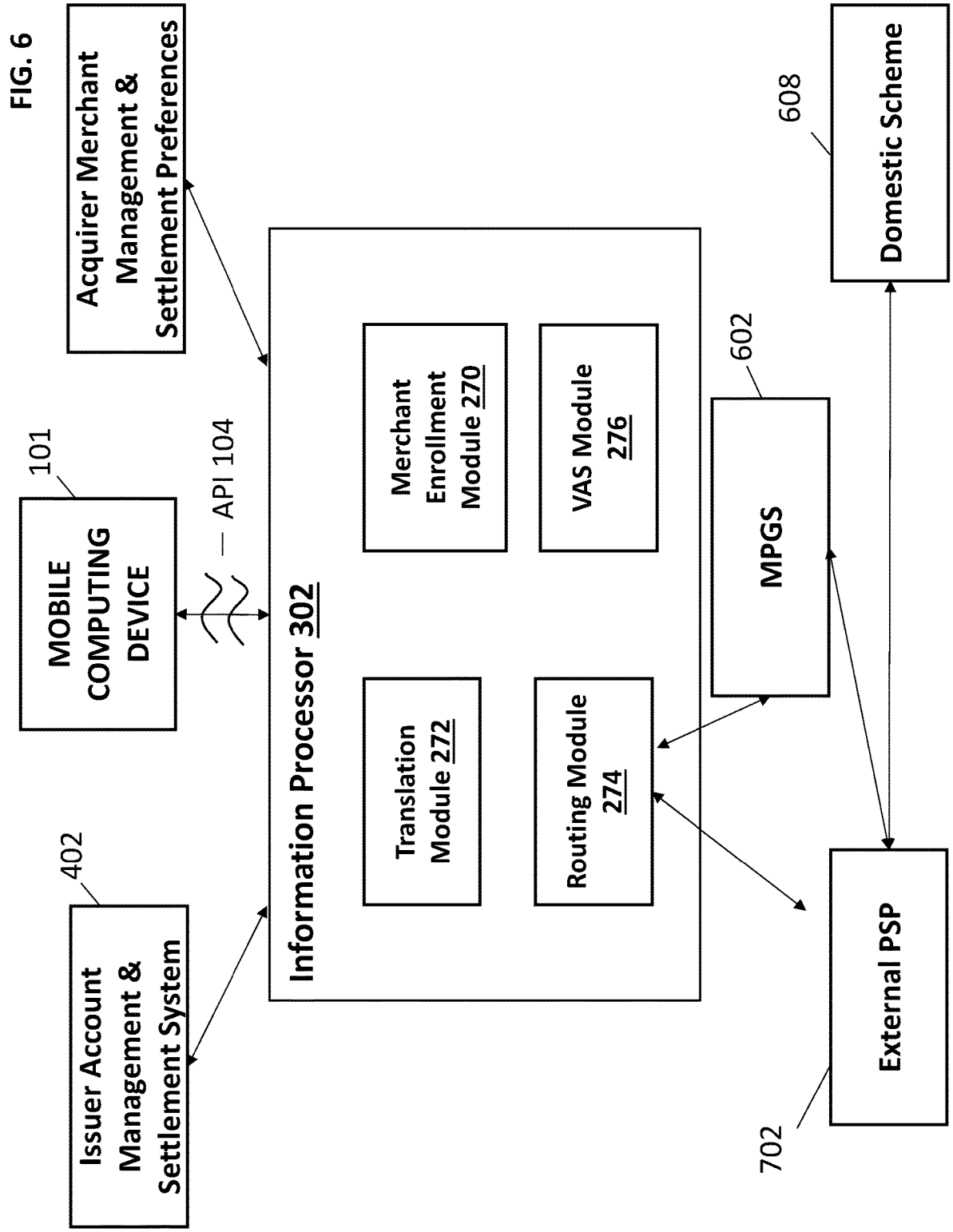
FIG. 6 is a block diagram illustrating the information processor comprising various modules and its connections to various systems and devices in connection with the method for configuring the mobile computing device to operate as a point of sale terminal in accordance with at least one embodiment disclosed herein.

FIG. 6 is a block diagram illustrating the information processor 302 and its various modules. As shown in FIG. 6, transaction payload encrypted with the issuer credential can be routed via a predetermined payment service provider (602 and/or 702) as discussed in further detail below.

Figure 7:
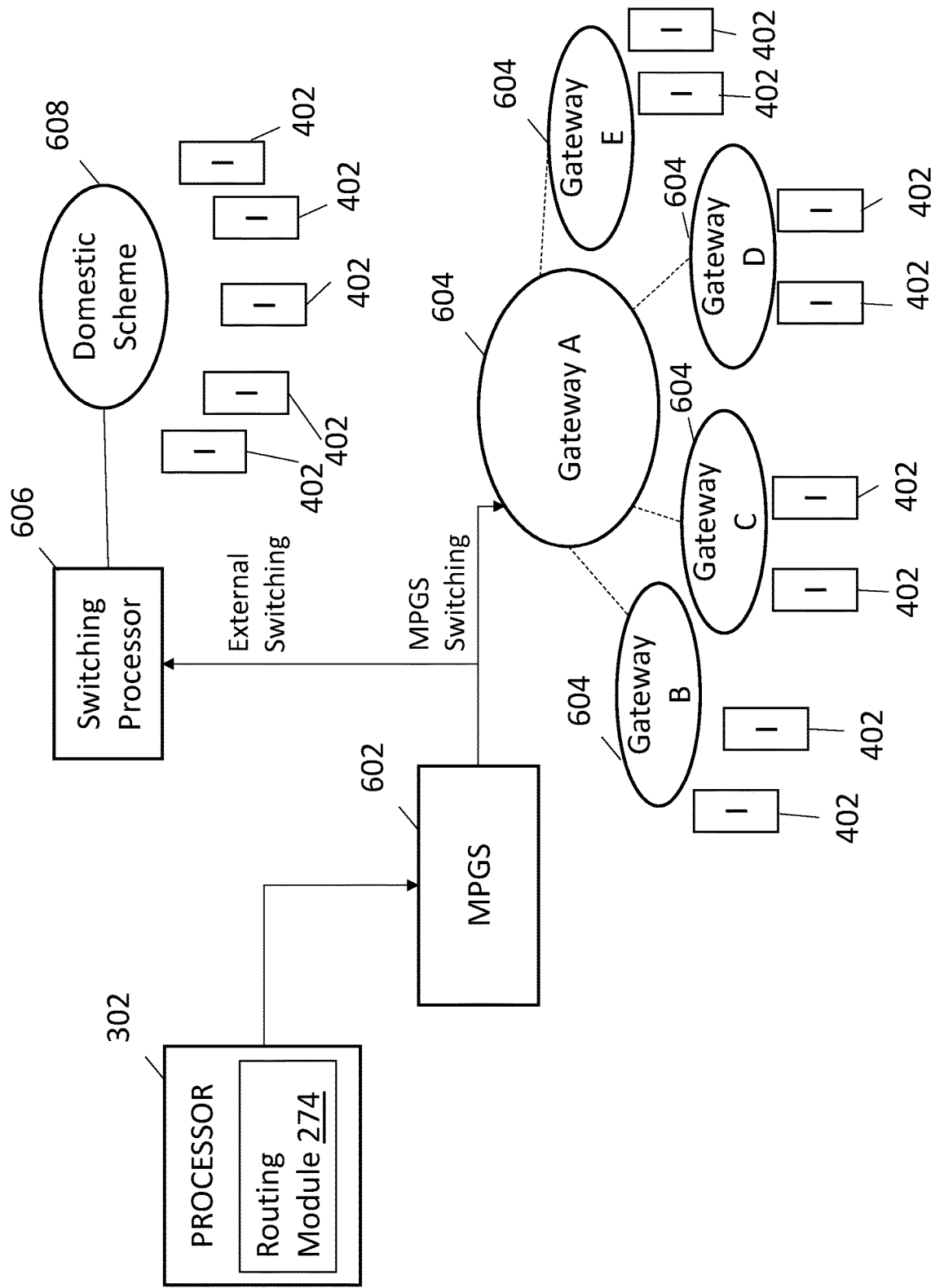
FIG. 7 is a block diagram illustrating the routing of an encrypted transaction payload via the processor in connection with the method for configuring the mobile computing device to operate as a point of sale terminal in accordance with at least one embodiment disclosed herein.

As exemplified in FIG. 7, in one or more implementations the predetermined payment service provider can be the Mastercard Payment Gateway Services (MPGS) 602. Payment service providers, such as the MPGS, can have connectivity in place linking multiple financial institutions and merchants globally. Payment service providers thus provide a network that facilitates the flow of payment transactions. In one or more implementations, the predetermined payment service provider can facilitate the use of value added services in connection with payment transactions associated with the merchants. At the same time, it is important that payment transactions be performed in a manner that meets the security interests of the various parties involved and other regulations.

In one or more implementations, the processor 302 can be configured to determine the predetermined payment service provider as a function of at least one preference in the merchant information transmitted to the processor 302 during enrollment at step S105. In other words, the predetermined payment service provider can be the preferred payment service provider of the merchant associated with the enrolled mobile computing device 101 that transmitted the transaction payload to the processor 302. As discussed above, the processor 302 can be configured to store merchant information in one or more databases. As such, in one or more implementations, the processor 302 can be configured to access the database(s) to retrieve the merchant information and determine the predetermined payment service provider preferred by the merchant.

The manner in which the transaction payload encrypted with the issuer credential is routed to the issuer device 402 via the predetermined payment service provider can vary. For instance, with reference to FIG. 7, in one or more implementations, the predetermined payment service provider performs direct issuer routing of the transaction payload to the issuer device 402. In the embodiment shown in FIG. 7, the predetermined payment service provider is MPGS 602, and the MPGS 602 is integrated and/or associated with the processor 302. As such, the processor 302 via MPGS 602 directly routes the transaction payload encrypted with the issuer credential to a gateway 604 (e.g., Gateway A-E) associated with the transaction account. In one or more embodiments, the processor 302 and/or MPGS 602 are configured to determine which particular gateway that is associated with the transaction account such that the encrypted transaction payload can be provided through the correct gateway for providing the payload to the issuer device 402.

As exemplified in FIG. 7, in one or more implementations, an issuer (issuer device(s) 402) in a particular transaction can be an issuer that is outside of the network of financial institutions linked to the predetermined payment service provider (e.g., MPGS), and thus the predetermined payment service provider cannot route the encrypted transaction payload to the issuer device via a gateway 604. For example, an issuer located in a particular locale (e.g., country, territory) may have a particular domestic scheme 608 that is separate from the network of financial institutions (e.g., issuers linked to gateways 604) linked to the predetermined payment service provider. Accordingly, in instances in which the issuer is outside of the network of financial institutions linked to MPGS 602, the predetermined payment service provider (e.g., MPGS) is configured to transmit the transaction payload encrypted with the issuer credential to a switching processor 606. Upon receipt, the switching processor 606 is configured to transmit the transaction payload encrypted with the issuer credential to an issuer device 402 via the domestic scheme 608.

In one or more implementations, a separate payment service provider not associated/integrated with the processor 302 (e.g., one that is not MPGS 602) may be selected as the predetermined payment service provider based on merchant preferences. As discussed above, the merchant preferences can be received by the processor 302 as part the merchant information received during enrollment of the mobile computing device 101. In implementations where the predetermined payment service provider is not MPGS, the predetermined payment service provider can be an acquirer payment service provider. The acquirer payment service provider (acquirer PSP) is then configured to route the transaction payload encrypted with the issuer credential to a gateway associated with the transaction account, and subsequently to the issuer device 402.

Figure 8:
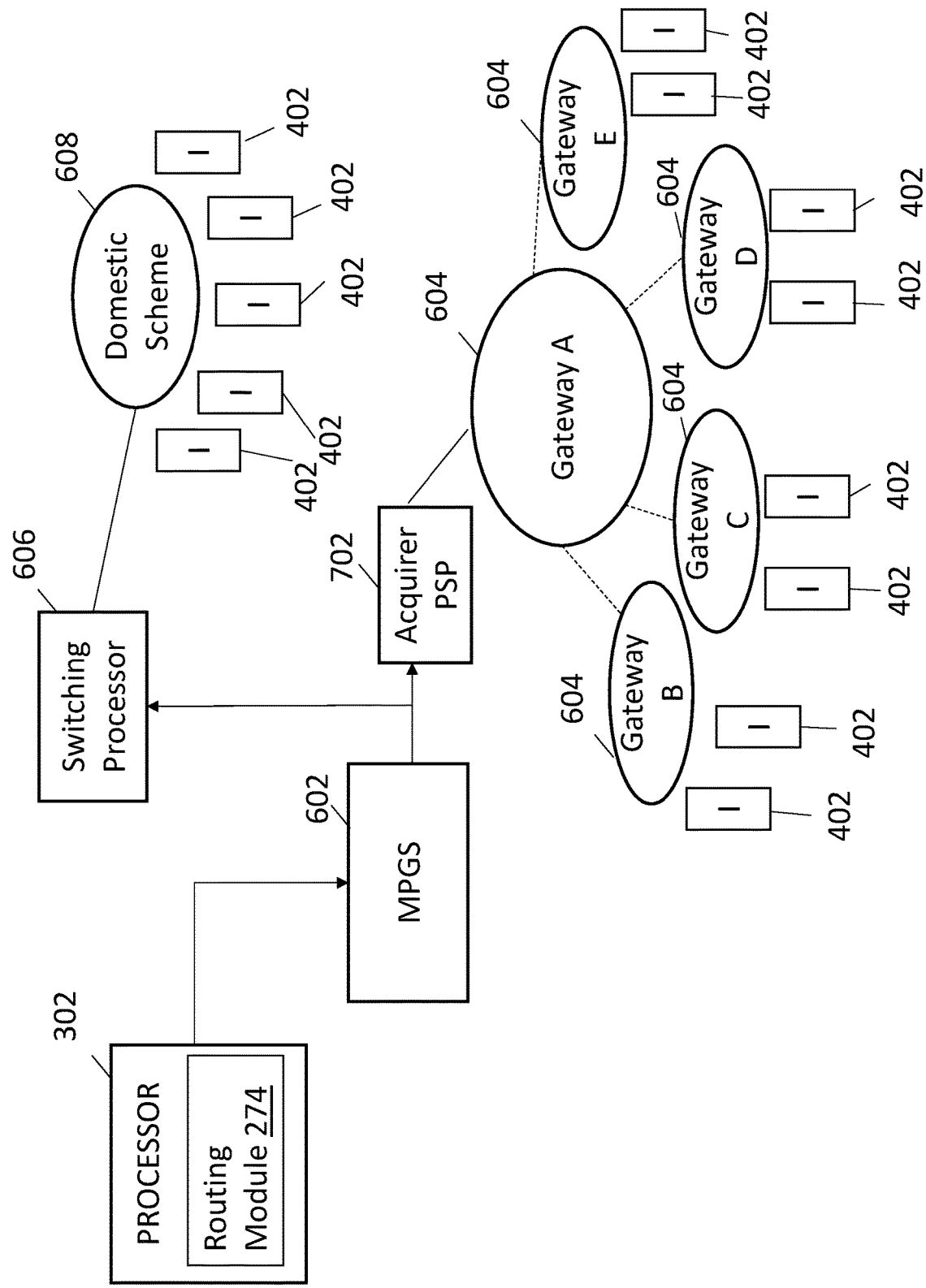
FIG. 8 is a block diagram illustrating the routing of an encrypted transaction payload via the processor using an acquirer payment service provider (PSP) in connection with the method for configuring the mobile computing device to operate as a point of sale terminal in accordance with at least one embodiment disclosed herein.

For instance, in one or more implementations, as exemplified in FIG. 8, the transaction payload can be routed to an acquirer PSP 702 via MPGS 602. In this embodiment, the processor 302 is configured by executing one or more software modules 230, including routing module 274, to route the encrypted transaction payload to the acquirer PSP 702 via MPGS 602. In other words, in this embodiment, MPGS 602 is utilized as a gateway to facilitate the routing of the encrypted transaction payload from the processor 302 to the acquirer PSP 702. The acquirer PSP 702 can then operate in substantially the same manner as the MPGS 602 operates in the embodiment of FIG. 7. Specifically, the acquirer PSP 702 routes the transaction payload encrypted with the issuer credential to a gateway 604 (e.g., Gateway A-E) associated with the transaction account. The acquirer PSP 702 is then configured to determine which particular gateway is associated with the transaction account such that the encrypted transaction payload can be provided through the correct gateway for providing the payload to the issuer device 402.

Like the embodiment shown in FIG. 7, in the one or more implementations as exemplified in FIG. 8, if the issuer is located in a particular locale having a domestic scheme 608 that is separate from the network of financial institutions and linked to the predetermined payment service provider, then the MPGS 602 is configured to transmit the transaction payload encrypted with the issuer credential to a switching processor 606. Upon receipt, the switching processor 606 is configured to transmit the transaction payload encrypted with the issuer credential to an issuer device 402 via the domestic scheme 608.

In one or more implementations as exemplified in FIG. 9, the transaction payload can be routed to an acquirer PSP 702 by the processor 302 without utilizing MPGS 602. In this embodiment, the processor 302 is configured by executing one or more software modules 230, including routing module 274, to route the encrypted transaction payload to a switching processor 606. The switching processor 606 is then configured to route the encrypted transaction payload from the processor 302 to an acquirer PSP 702. The acquirer PSP 702 can then operate in substantially the same manner as the MPGS 602 operates in the embodiment of FIG. 7. Specifically, the acquirer PSP 702 routes the transaction payload encrypted with the issuer credential to a gateway 604 (e.g., Gateway A-E) associated with the transaction account. The acquirer PSP 702 is then configured to determine which particular gateway is associated with the transaction account such that the encrypted transaction payload can be provided through the correct gateway for providing the payload to the issuer device 402.

If the issuer is located in a particular locale having a domestic scheme 608 that is separate from the network of financial institutions linked to the predetermined payment service provider, then the switching processor 606 is configured to transmit the transaction payload encrypted with the issuer credential to an issuer device 402 via the domestic scheme 608.

Referring again to FIG. 5, at step S135 the processor 302 is configured by executing one or more software modules 230, to receive approval of the transaction. Upon receipt of the transaction payload encrypted with the issuer credential, the issuer device 402 is configured to transmit approval of the transaction to the processor 302. In one or more implementations, the approval of the transaction can be routed through the predetermined payment service provider before being received by the processor 302.

In conjunction with receiving approval of the transaction, in one or more implementations the predetermined payment service provider is configured to receive settlement information representing payment by the issuer. In one or more implementations, the predetermined payment service provider can be further configured to transmit at least some of the settlement information to an acquirer of the merchant. In at least one implementation, the predetermined payment service provider is configured to transmits the settlement information to the switching processor 606, and the switching processor 606 is then configured to transmit at least some of the settlement information to an acquirer of the merchant (see FIG. 9).

Referring again to FIG. 5, at step S140 the processor 302 is configured by executing one or more software modules 230 to transmit approval information to the enrolled mobile computing device 101 for notifying the associated merchant that the transaction is approved. In one or more implementations, the enrolled mobile computing device 101 can be further configured to transmit approval information to the customer payment device 102. In one or more implementations, the approval information transmitted to the customer payment device 102 can be in the form of a text notification, for example. The enrolled mobile computing device 101 can be configured to transmit the text notification as a VAS based on merchant preferences provided during enrollment of the mobile computing device 101. In one or more implementations, other VAS such as loyalty-based services can also be implemented following approval of a transaction in place of or in addition to text notification VAS. Again, the implementation of other or additional VAS can be based on merchant preferences provided during enrollment of the mobile computing device 101.

In one or more implementations, the information processor 302 can interface with an OEM-based server and/or a mobile point-of-sale (MPOS) server. Accordingly, in one or more implementations, one or more of the steps discussed above with reference to FIG. 5 can be performed by an MPOS server, an OEM-based server, or both.

In at least one embodiment, the present disclosure can further include a merchant commerce server that is configured to effect online purchases and credit card transactions. Specifically, transmissions between a merchant mobile computing device 101 and an OEM backend server 103 can occur vis-à-vis a separate server, such as a merchant commerce server. For example, a merchant mobile computing device 101 can execute a merchant mobile application that includes functionality (e.g., commands, functions, processes, etc.) in an SDK, including to configure the merchant mobile computing device to encrypt a transaction payload. The merchant mobile computing device 101 can transmit the encrypted transaction payload to the merchant commerce server. The merchant commerce server sends the encrypted transaction payload to the OEM backend server 103 via the OEM merchant enablement API 104.

In one or more implementations, the present disclosure provides additional functionality for a merchant, vis-à-vis the merchant's respective merchant commerce server. For example, the merchant commerce server can be leveraged by a respective merchant to perform various upfront transaction processing, such as particular value-added service processing, transaction validation, card-on-file invocation, or other merchant-specific processing, depending upon a particular role/model. More broadly, a merchant commerce server can also act as a pass-through device for transmitting encrypted payloads. This is particularly useful in business-to-business ("B2B") implementations that restrict direct connection/ integration from a mobile computing device to a back-end server device due to inherent security risks. By using a merchant commerce server as a pass-through device, API-related restrictions can be avoided, as the transmissions there-between are server to server, and not mobile device ("client") to server.

In various embodiments, two general deployment models can be included. In a first such deployment model, a proprietor of the present disclosure hosts all the backend servers on behalf of an OEM provider, for transmission to information processor 302 and further processing, such as shown and described herein. Alternatively, a proprietor of the present disclosure hosts all the backend servers on behalf of a third-party mobile point of sale provider (MPOS) server. In a second, alternative, deployment model, an SDK is provided that can be used to integrate functionality (e.g., commands, functions, processes, etc.) with a merchant mobile application of the OEM provider or the MPOS provider to orchestrate features shown and described herein, such as offering value add services.

In one or more implementations of the second deployment model, the transaction payload is transmitted from the enrolled merchant mobile computing device 101 (executing the merchant mobile application that is integrated with the SDK) to the MPOS server or the OEM backend server 103, and then to the information processor 302. In this deployment model, the SDK architecture integrated with the merchant mobile application is configured to i) perform a device integrity check (validate the integrity of the device), ii) ensure a secure connection with the information processor 302, and iii) execute client-based services, such as payment encryption or one or more VAS.

It should also be noted that although much of the foregoing description has been directed to systems and methods for configuring a mobile computing device to operate as a point of sale terminal, the systems and methods disclosed herein can be similarly deployed and/or implemented in scenarios, situations, and settings far beyond the referenced scenarios.

It is to be understood that like numerals in the drawings represent like elements through the several figures, and that not all components and/or steps described and illustrated with reference to the figures are required for all embodiments or arrangements. Thus, illustrative embodiments and arrangements of the present systems and methods provide a computer implemented method, computer system, and computer program product for facilitating the automatic provisioning of an electronic record to a user conducting a transaction at a transaction terminal. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method, comprising:

providing, by an information processor to a plurality of mobile computing devices, software having instructions that, when executed, configure the plurality of mobile computing devices;

receiving, by the information processor from one configured mobile computing device of the plurality of mobile computing devices, an encrypted transaction payload including transaction information representing at least i) a transaction initiated between a merchant and a customer, ii) an identification of the merchant, iii) an amount of the transaction, and iv) a transaction account associated with the customer, wherein the transaction payload is encrypted using at least an original equipment manufacturer ("OEM") device credential associated with the one configured mobile computing device;

decrypting, by the information processor, the transaction payload using at least the OEM device credential associated with the one configured mobile computing device;

determining among a plurality of issuers, by the information processor, an issuer of the transaction account and a predetermined payment service provider;

validating, by the information processor, information in the encrypted transaction payload by transmitting at least some of the information in the transaction payload to a computing device associated with the issuer of the transaction account and receiving, in response from the computing device associated with the issuer, an issuer credential;

encrypting, by the information processor, the transaction payload using the issuer credential;

transmitting, by the information processor via the predetermined payment service provider, the transaction payload that is encrypted with the issuer credential to the computing device associated with the issuer;

receiving, by the information processor from the computing device associated with the issuer, approval of the transaction; and transmitting, by the information processor, approval information to the one configured mobile computing device for notifying the merchant that the transaction is approved.

2. The method of claim 1, wherein validating the information in the transaction payload further includes:

identifying the merchant from the transaction information; and verifying the identified merchant as an authorized merchant as a function of at least one merchant on-boarding process.

3. The method of claim 2, wherein the at least one merchant on-boarding process includes accessing, by the information processor, a database that includes information representing:

a plurality of merchants associated with respectively configured mobile computing devices;

a respective acquirer associated with at least one of the plurality of merchants associated with the respectively configured mobile computing devices; and a respective value-added service associated with at least one of the plurality of merchants associated with the respectively configured mobile computing devices.

4. The method of claim 1, wherein the transaction payload further includes a personal identification number ("PIN") associated with the transaction account, and further wherein validating the transaction account includes transmitting the PIN to the computing device associated with the issuer.

5. The method of claim 4, wherein the issuer credential is received in response to transmitting the PIN, by the information processor to the device associated with the issuer.

6. The method of claim 1, further comprising:

determining, by the information processor, the predetermined payment service provider as a function of the at least one preference of the merchant.

7. The method of claim 1, wherein the predetermined payment service provider includes Mastercard payment gateway services.

8. The method of claim 1, wherein the encrypted transaction payload further includes acquirer information representing at least one acquiring management and settlement institution.

9. The method of claim 1, wherein the encrypted transaction payload further includes information representing one or more value-added services that include at least one of: security services, loyalty-based services, and text notification services.

10. The method of claim 9, wherein the security services include at least one of tokenization, authentication, and fraud management.

11. The method of claim 1, further comprising:

mapping, by the information processor, respective ones of the plurality of mobile computing devices to at least one preference associated with respective ones of a plurality of merchants.

12. The method of claim 11, wherein the mapping is in accordance with a database.

13. The method of claim 1, further comprising:

storing, by the information processor, at least one of the OEM device credential, the issuer credential, and the merchant information in a database.

14. A system, comprising:

an information processor comprising non-transitory processor readable media, wherein the non-transitory processor readable media having instructions for causing the following steps to be performed by the information processor:

provide, to a plurality of mobile computing devices, software having instructions that, when executed, configure the plurality of mobile computing devices;

receive, from one configured mobile computing device of the plurality of mobile computing devices, an encrypted transaction payload including transaction information representing at least i) a transaction initiated between a merchant and a customer, ii) an identification of the merchant, iii) an amount of the transaction, and iv) a transaction account associated with the customer, wherein the transaction payload is encrypted using at least an original equipment manufacturer ("OEM") device credential associated with the one configured mobile computing device;

decrypt the transaction payload using at least the OEM device credential associated with the one configured mobile computing device;

determine, among a plurality of issuers, an issuer of the transaction account and a predetermined payment service provider;

validate information in the encrypted transaction payload by transmitting at least some of the information in the transaction payload to a computing device associated with the issuer of the transaction account and receiving, in response from the computing device associated with the issuer, an issuer credential;

encrypt the transaction payload using the issuer credential;

transmit, via the predetermined payment service provider, the transaction payload that is encrypted with the issuer credential to the computing device associated with the issuer;

receive, from the computing device associated with the issuer, approval of the transaction; and transmit approval information to the one configured mobile computing device for notifying the merchant that the transaction is approved.

15. The system of claim 14, wherein the non-transitory processor readable media further have instructions for causing the following steps to be performed by the information processor:

identify the merchant from the transaction information; and verify the identified merchant as an authorized merchant as a function of at least one merchant on-boarding process, and wherein the at least one merchant on-boarding process includes accessing, by the information processor, a database that includes information representing:

a plurality of merchants associated with respectively configured mobile computing devices;

a respective acquirer associated with at least one of the plurality of merchants associated with the respectively configured mobile computing devices; and a respective value-added service associated with at least one of the plurality of merchants associated with the respectively configured mobile computing devices.

16. The system of claim 14, wherein the transaction payload further includes a personal identification number ("PIN") associated with the transaction account, and further wherein validating the transaction account includes transmitting the PIN to the computing device associated with the issuer.

17. The system of claim 14, wherein the issuer credential is received in response to transmitting the PIN, by the information processor to the computing device associated with the issuer.

18. The system of claim 14, wherein the non-transitory processor readable media further have instructions for causing the following steps to be performed by the information processor:
   determine the predetermined payment service provider as a function of at least one preference of the merchant.

19. The system of claim 14, wherein the non-transitory processor readable media further have instructions for causing the following steps to be performed by the information processor:
   map respective ones of the plurality of mobile computing devices to at least one preference associated with respective ones of a plurality of merchants.

20. The system of claim 14, wherein the mapping is in accordance with a database.

\* \* \* \* \*